Feb. 1, 1944.  J. H. BEACH  2,340,408

REFRIGERATION

Filed Dec. 30, 1940  2 Sheets-Sheet 1

INVENTOR
Justice H. Beach
BY
Harry S. Demaree
ATTORNEY

Feb. 1, 1944.   J. H. BEACH   2,340,408
REFRIGERATION
Filed Dec. 30, 1940   2 Sheets-Sheet 2

INVENTOR
Justice H. Beach
BY Harry S. D'Emner
ATTORNEY

Patented Feb. 1, 1944

2,340,408

UNITED STATES PATENT OFFICE 2,340,408

REFRIGERATION

Justice H. Beach, Canton, Ohio, assignor to The Hoover Company, North Canton, Ohio Application December 30, 1940, Serial No. 372,225

19 Claims. (Cl. 62—5)

This invention relates to refrigeration, and more particularly to a means and method of controlling the supply of energy to an absorption refrigerating apparatus.

Heretofore, it has been the general practice to control the heat input to the refrigerant generators of absorption systems, by (1) modulating the heat input in accordance with the refrigeration demand, (2) employing a "high-low" control, or (3) employing an "off-on" main burner associated with a separate pilot for reigniting the main burner. Each of these three types of control have certain disadvantages which I have overcome by my novel arrangement and mode of control as will be explained in detail presently.

The modulating type of control is undesirable because it is inefficient and uneconomical. Systems utilizing this control operate continuously, and the fuel input to the burner is varied in accordance with the refrigeration demand. It is well known that absorption systems are sensitive to the heat input to the boiler, and for maximum efficiency of both the burner-generator assembly and the system itself, the heat input should be maintained constant.

The "high-low" type of control involves operating the refrigeration system and the burner at a fixed "high" rate so long as there is a demand for refrigeration, and thereafter operating the burner at a "low" rate just insufficient to distill refrigerant. This type of control is highly satisfactory when operating on "high" flame, because it permits both the refrigerating system and the burner to be designed to operate at maximum efficiency for a given heat input, but is highly unsatisfactory and uneconomical when operating at "low" flame. Refrigerant generators are heavily insulated against heat losses and contain a relatively small amount of solution. Theoretically, when there is no demand for refrigeration, it should be necessary to supply only the small amount of heat needed to compensate for leakage from the generator to maintain the solution temperature slightly below the distillation temperature.

In actual practice, however, it is found that a far greater quantity of fuel is required for operation of the system on "low flame" than that necessary to compensate for heat leakage. There are two principal reasons for this. First, the combustion gas flue which must be provided for proper "high" flame operation, entrains air greatly in excess of that required for "low" flame operation. This excess air not only serves to insulate the flame from the generator proper, but to cool the generator very effectively. Secondly, if the burner is designed for proper operation at "high" flame, the fuel supply at "low" flame cannot be reduced as much as desired without rendering the operation of the burner unstable and subject to extinguishment by stray air currents or by the slightest variation in the draft. In practice it is found that the minimum rate of fuel supply for a "low" flame is 20% of that for "high" flame. Moreover, practically none of this fuel contributes in any way to the production of refrigeration.

The third form of conventional control, namely, one employing an "off-on" main burner associated with a separate pilot, has certain advantages over the other two known types of control, but is in itself subject to certain disadvantages which are obviated by the present invention. Usually, safety codes require the use of a thermostatic safety cutoff with this form of control. The safety cutoff device may be held in open position by the heat of the main burner flame when the same is present, but the pilot must be sufficiently large to hold the safety cutoff open whenever the main flame is not burning, as well as to perform its function of reigniting the main flame. This type of control has the advantage over the "high-low" type of control, that the pilot burner can be specially designed to operate with a fuel input considerably less than that required to maintain a "low" flame on the main burner in the former type of control. Nevertheless, in absorption type household refrigerators, the minimum fuel supply to the pilot burner is approximately 10% of that required for the main burner. This very considerable amount of fuel is unavailable for the production of refrigeration, thereby resulting in waste and inefficiency.

The present invention proposes a construction in which the advantages of the "high-low" and of the "off-on" type of controls are retained, and the disadvantages of each type are eliminated, thereby providing a highly superior type of control.

It is accordingly an object of this invention to provide an absorption refrigeration system with automatic control mechanism operating in a novel manner thereby permitting greatly increased efficiency and economy of operation. More specifically, it is an object of this invention to provide a modified "off-on" control so arranged that the total fuel supply to a refrigerator is available to heat the generator during a demand for refrigeration, and so that the pilot flame reverts to a position to heat the safety cutoff during periods of no refrigeration demand.

Another object of the invention is to provide a novel burner and safety cutoff device in which the pilot flame is automatically merged with the main burner flame when fuel is supplied to the main burner, and in which the pilot flame reverts to a safety cutoff heating position when the main burner fuel supply is terminated.

Another object of the invention is to provide a new and improved control mechanism and arrangement with an absorption refrigeration apparatus and a new method of controlling the energy supplied to such apparatuses. Another object is to improve the operating efficiency of absorption refrigeration systems.

It is another object of this invention to provide the generator of an absorption refrigeration apparatus with a main burner and an igniting pilot so arranged relative to one another that the pilot flame will automatically merge with the main burner flame whenever the same is present and which will automatically revert to a non-boiler heating position when the main burner flame is not present whereby to improve the operating efficiency of such apparatuses.

Still another object of the invention is to provide an absorption refrigerating apparatus with a main burner, a pilot, a safety cutoff, and a refrigeration demand control so arranged that the pilot flame is merged with the main flame and the safety cutoff is indirectly heated during a demand for refrigeration and so that the safety cutoff is directly heated by the pilot during the off period.

Other objects and advantages of this invention will become apparent when taken in connection with the accompanying drawings, in which.

Figure 1:
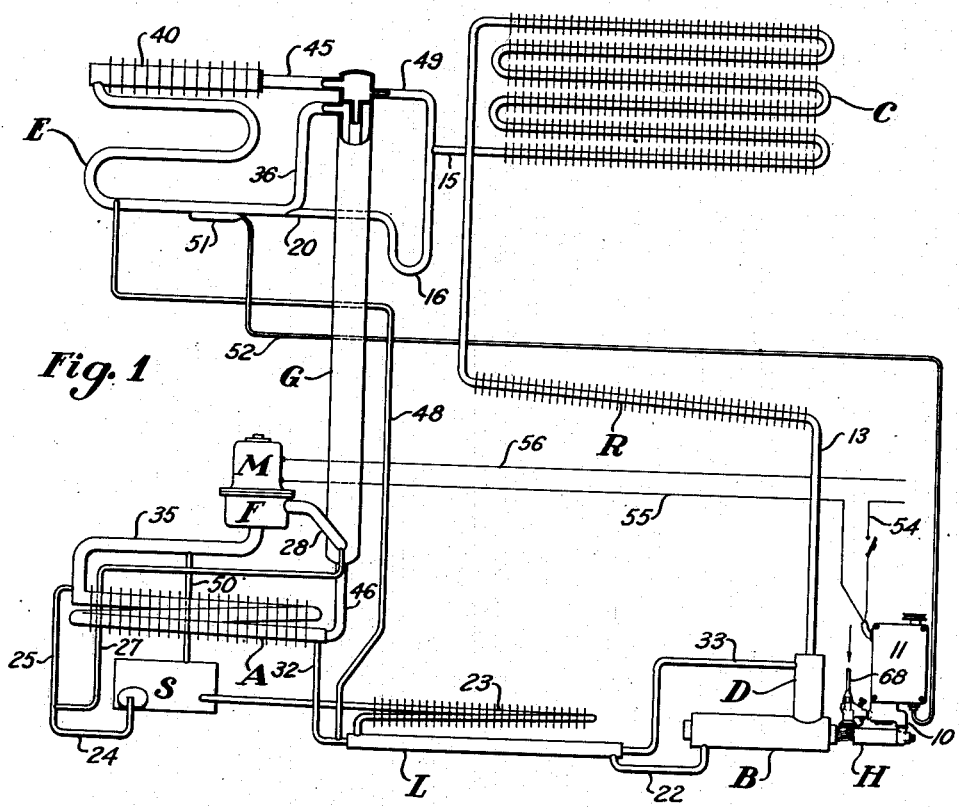
Figure 1 is a diagrammatic representation of an absorption refrigerating apparatus with this invention applied thereto.

Referring to Figure 1 of the drawings, there is disclosed a three-fluid absorption refrigerating system of well known type. It will, of course, be understood that the invention is applicable to absorption systems of all types, and, in certain broader aspects, to heat operated devices generally. The system shown in the drawings by way of illustration comprises a boiler B, an analyzer D, an air-cooled rectifier R, a tubular air-cooled condenser C, an evaporator E, a gas heat exchanger G, a tubular air-cooled absorber A, a liquid heat exchanger L, and a circulating fan F which is driven by an electric motor M.

The above described elements are interconnected by various conduits to form a plurality of gas and liquid circuits constituting a complete refrigerating system readily understood by those skilled in this art and to which reference will be made in more detail hereinafter.

The refrigerating system is preferably charged with a suitable refrigerant, such as ammonia, a suitable absorbent such as water and a suitable inert pressure equalizing medium, such as nitrogen.

The boiler B is heated by a main gas burner 10 more fully described hereinafter. The circulating motor M and the gas burner 10 may be controlled by a suitable control device 11.

The application of heat to the boiler B liberates refrigerant vapor from the strong solution contained therein. The vapor so liberated passes upwardly through analyzer D, through conduit 13, rectifier R, and into condenser C where it is liquefied. The liquefied refrigerant discharges through a conduit 15 into one leg of a U-shaped conduit 16. The other leg is connected to the bottom of evaporator E through conduit 20. The right hand leg of conduit 16 is appreciably longer than the other for a purpose to be described hereinafter.

The weak solution formed in the boiler by the generation of refrigerant vapor therefrom passes from the boiler through conduit 22, the outer pass of liquid heat exchanger L, and an air-cooled solution pre-cooler 23 into solution reservoir S. The weak solution is conveyed from reservoir S through a U-shaped conduit 24 opening into a vertically extending tube 25 of small diameter forming a gas lift pump the upper end of which discharges into the top of absorber A.

It is evident that the top of the absorber is located above the solution level normally prevailing in the boiler-analyzer-reservoir system whereby some means must be provided to elevate the absorption solution to the top of the absorber. For this purpose a small bleed conduit 27 is connected to the discharge conduit 28 of the circulating fan F and leads to the junction of the conduits 24 and 25 which is below the solution level normally prevailing in the reservoir whereby the weak solution is elevated into the top of the absorber by gas lift action.

In the absorber the weak solution flows downwardly by gravity in counterflow to the rich pressure equalizing medium refrigerant vapor mixture flowing upwardly therethrough and absorbs the refrigerant vapor. The heat of absorption is rejected to the surrounding air as by air cooling fins mounted on the exterior walls of the absorber vessel. The strong solution formed in the absorber discharges into a conduit 32 which opens into the inner pass of the liquid heat exchanger L from which the strong solution is conveyed to analyzer D by conduit 33.

The lean pressure equalizing medium and refrigerant vapor mixture formed in the absorber is taken from the upper portion thereof through the conduit 35 into the suction side of the circulating fan F in which it is placed under pressure and discharged through the conduit 28 into the outer pass of the gas heat exchanger G, through a downwardly extending conduit 36 leading to the bottom of evaporator E. The liquid refrigerant and inert gas are therefore seen to enter the evaporator together. The diameter of the evaporator conduits is relatively small whereby the pressure equalizing medium flows through them at a relatively high velocity. As a result, the pressure equalizing medium sweeps or drags the liquid refrigerant with it upwardly through the evaporator into the high temperature or box-cooling conduit 40. During this operation the refrigerant evaporates by diffusion into the pressure equalizing medium to produce refrigeration. In the conduit 40 the velocity of the inert gas stream is relatively slow by reason of the larger diameter of this conduit and the liquid refrigerant distributes itself there-along by gravity. Any residue refrigerant overflows through conduit 45 and into the inner pass of the gas heat exchanger.

The rich pressure equalizing medium refrigerant vapor mixture formed in the evaporator is conducted therefrom into the inner pass of the gas heat exchanger G through conduit 45. The opposite end of the gas heat exchanger G communicates with the bottom portion of the absorber A through conduit 46. In the absorber A the rich pressure equalizing medium refrigerant vapor mixture flows upwardly in counterflow to absorption solution whereby the refrigerant vapor content of the mixture is absorbed in the weak solution.

The bottom coil of the evaporator E is provided with a drain conduit 48 which opens into the strong solution return conduit 32. Conduit 48 opens into the top portion of the bottom coil of the evaporator whereby it will not completely drain said conduit. The upper portion of the condenser discharge conduit 15 is vented by means of vent 49 to the inner pass of the gas heat exchanger. Solution reservoir S is vented through conduit 50 to the suction conduit 35 of the circulating fan.

The circulating fan F places the pressure equalizing medium discharged therefrom under a small pressure in the neighborhood of a few inches of water. In order to prevent this pressure, which also prevails in conduit 36, from being reflected back to the boiler through the condenser and conduit 13, one leg of conduit 16 has been made appreciably longer than the other. By this construction it is seen that a pressure balancing column of liquid is formed in conduit 16 of sufficient height to balance the pressure created by fan F in conduit 36.

I will now describe my novel control arrangement for the foregoing system. The main gas valve and motor switch operating mechanism 11 may be of any suitable type. I have found a mechanism such as that disclosed in the application for Letters Patent of Curtis C. Coons, S. N. 148,424, filed June 16, 1937, particularly satisfactory, and reference may be had to that specification for a detailed disclosure. Control 11 is actuated, as by a thermally responsive bulb 51 positioned on or near evaporator E. This bulb contains an expansible fluid and communicates through tubing 52 with a bellows forming a part of device 11. The bellows actuates a snap-action mechanism for simultaneously supplying current to motor M through wires 54, 55, 56, and supplying gas to main burner 10.

Figure 2:
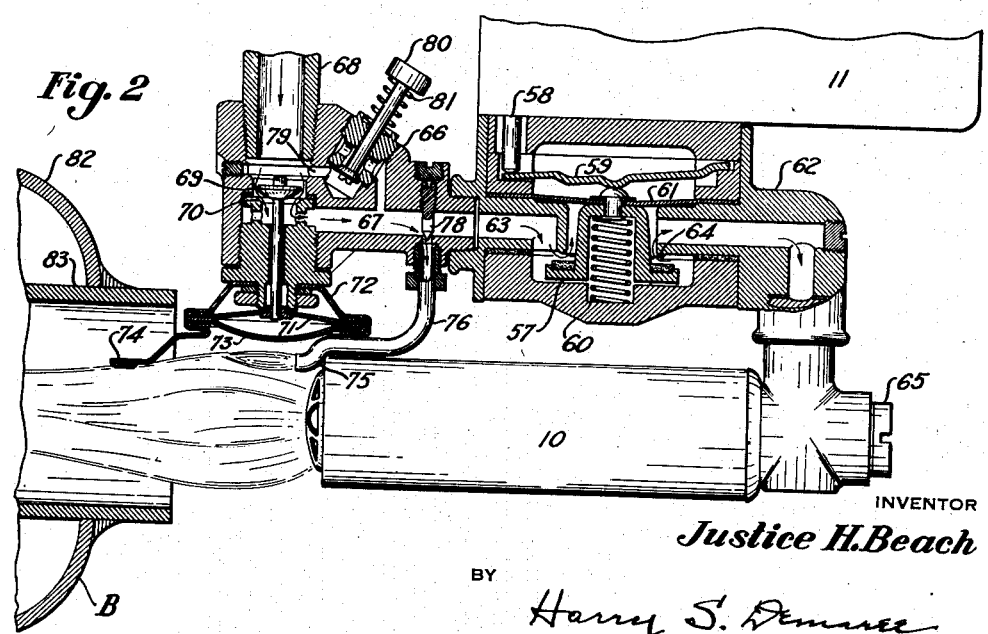
Figure 2 is a fragmentary view partly in section of the burner according to this invention with a control therefor depicting the operation of the device when the main burner is in operation.
Figure 3:
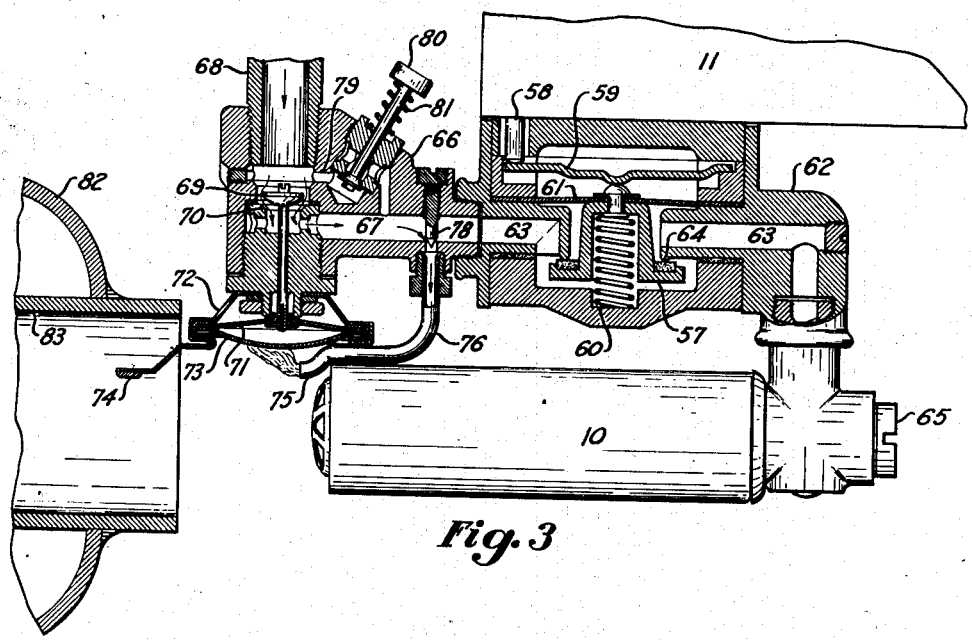
Figure 3 is a view similar to that of Figure 2 depicting the device when the main burner is not operating.

Referring to Figures 2 and 3, device 11 includes a push rod 58 operated by the snap-action mechanism and cooperating with a movable plate 59 to move the valve 57 to open position upon a demand for refrigeration. Valve 57 is moved to closed position by a spring 60 and is supported for movement in valve body 62 by a flexible sealing disc 61. Valve body 62 has a passage 63 therethrough leading past the valve seat 64 to Bunsen burner 10 which is suitably secured to the under side of the valve body 62 and extends forwardly thereunder toward the boiler B. The valve 57 may be provided with a suitable gasket as shown to provide a good seal with the valve seat 64 when the valve is closed. The fuel supply to the burner is adjusted for optimum operating conditions by a needle valve not shown but housed beneath cap screw 65 at the end of the burner.

A thermostatic safety cut-off assembly 66 of well known type is secured to the front end of valve body 62. A passageway 67 therethrough leads from the gas supply pipe 68 to passage 63 in valve body 62. A safety cut-off valve 69 is suitably arranged in the body 66 and cooperates with seat 70 to close the passage 67 under certain conditions to be referred to later.

Valve 69 is actuated by a bi-metallic thermostatic disc 71 secured to the body member 66 by heat conducting sheet metal elements 72 and 73 crimped over the edge thereof. Elements 72 and 73 also prevent the escape of gas from the passageway 67. A heat conducting element 74 extends forwardly and downwardly from the elements 72 and 73 and into heating relationship to the flame of burner 10.

A pilot burner 75 communicates with passage 67 through conduit 76. Needle valve 78 controls the gas flow to pilot burner 75. Conduit 76 communicates with the passage 67 at a point where it is not affected by the valve 57 but is shut off from the gas line 68 when the thermostatic safety valve 69 is closed. Housing 66 has a passageway 79 by-passing the safety valve 69. Gas flow through the by-pass is controlled by a push button valve 80 normally held in closed position by spring 81.

As shown in Figures 2 and 3, boiler B comprises a cylindrical container 82 having a flue 83 extending centrally therethrough. The inturned ends of the cylindrical container 82 may be secured to the flue tube 83 as by welding.

Under the conditions illustrated in Figure 3, valve 57 is closed and no gas is being supplied to the main burner. Since no heat is being supplied to the boiler, flue 83 will be cold and there will be no draft therethrough to divert the pilot flame. Consequently the pilot flame will directly contact cover 73 of the safety cut-off device to maintain valve 69 open. As is evident from Figure 3, the pilot flame does not heat the boiler while the main burner is extinguished. Therefore, it is possible to reduce the fuel supply to the pilot burner according to my novel arrangement to the minimum amount required to maintain a stable flame and to keep the safety cut-off valve open.

Upon a demand for refrigeration, main valve 57 is opened and fan F is energized to circulate the inert medium and the absorption solution. As soon as gas exits from burner 10, it is ignited by the pilot. The main burner flame creates a very considerable draft of secondary air which serves to divert the pilot flame and merge it with the main flame to thereby supplement the main flame in heating the boiler, all as clearly illustrated in Figure 2. The safety cut-off is now heated by means of heat conductor 74 which is preferably so positioned as to be wiped by the combined flames of pilot 75 and main burner 10. The refrigeration system will operate at maximum efficiency so long as there is a demand for refrigeration. As soon as the refrigeration demand has been satisfied, thermostat 51 will actuate device 11 to discontinue all heating of the boiler and to discontinue the operation of the fan motor.

If the gas supply should fail for any reason at any time, the safety cut-off will function to discontinue the gas supply to burner 10 and pilot 75 regardless of whether or not there is a demand for refrigeration. As soon as the cause of gas failure has been overcome, an attendant can place the system back into automatic operation by the simple expedient of depressing by-pass valve 80, igniting the pilot, and allowing safety valve 69 to open.

Figure 4:
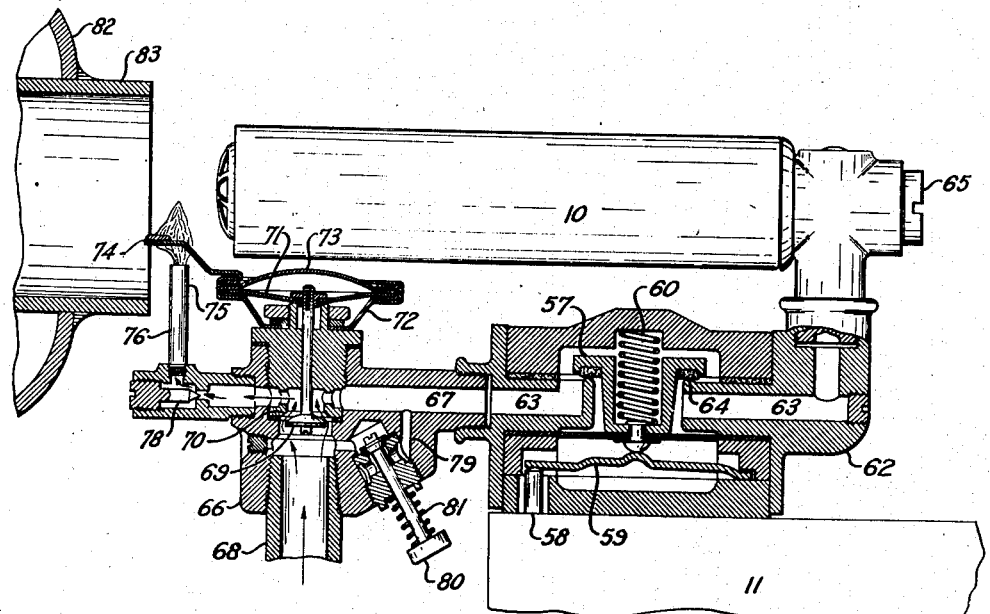
Figure 4 shows a modified form of the burner and control therefor according to this invention.

The modification shown in Figure 4 is substantially the same as the preferred embodiment except that burner 10 is positioned above the control 11 and pilot 75 is positioned beneath heat conductor 74. The various parts have been given the same reference characters as in Figures 2 and 3 since there is no substantial change therein except a slightly different arrangement of parts. It is to be pointed out that in this modification, as well as in that of Figures 2 and 3 the heat generated by the flame of the pilot burner 75 is merged with the main flame to heat the boiler when the main burner 10 is in operation.

From the foregoing it will be apparent that the present invention provides an absorption refrigeration system and an automatic control which incorporates the advantages of and overcomes the disadvantages of constructions heretofore proposed. Moreover, my novel arrangement and mode of operating an absorption refrigerator is simpler and vastly more efficient.

While I have shown only two embodiments of my invention, it is to be understood that these are to be taken as illustrative only and not in a limiting sense. Various changes may be made without departing from the spirit of the invention. For example, my novel control is of general utility in numerous other environments, as will be readily appreciated. While I have described the fan motor as being controlled in synchronism with the main burner, this motor may be controlled independently, or in time delayed relationship. Furthermore, it will be obvious that the main burner, pilot and safety cut-off may be arranged in a variety of ways other than those herein specifically disclosed and yet be within the scope of this invention.

I claim:

1. The method of heating an absorption refrigeration apparatus of the type having a refrigerant generator, a main burner and a pilot burner operatively associated therewith which comprises, heating said generator by said main burner and said pilot burner upon a demand for refrigeration, discontinuing the fuel supply to said main burner when the demand for refrigeration has been satisfied, and continuing the fuel supply to said pilot while discontinuing the heating of said generator by said pilot so long as there is no demand for refrigeration.

2. The method of heating and controlling the operation of an absorption refrigeration apparatus of the type having a refrigerant generator, a main burner and a pilot operatively associated therewith which method comprises, supplying fuel to said pilot continuously, supplying fuel to said main burner only during a demand for refrigeration, and diverting the pilot flame from a normally non-heating to a generator heating position during a demand for refrigeration whereby fuel supplied to said main burner and said pilot is utilized to produce refrigeration upon a demand for refrigeration and whereby said generator is not heated when there is no refrigeration demand.

3. In combination, an absorption refrigeration apparatus having a boiler, a solution circuit, an inert gas circuit and a motor driven circulating unit for circulating a solution in the solution circuit and an inert gas in said inert gas circuit, a primary burner for heating said boiler, fuel control means for said primary burner, control means responsive to the temperature of a portion of said apparatus for simultaneously energizing said motor and operating said fuel control means to supply fuel to said burner, a pilot burner for said primary burner, said pilot burner being so arranged relative to said boiler and primary burner as to heat said boiler only during operation of said primary burner.

4. In combination, an absorption refrigerating apparatus having an evaporator and a boiler, a gas burner for supplying heat to said boiler, means including an on-off gas valve responsive to the evaporator temperature for supplying gas to said burner, a thermostatic safety cut-off valve for said burner positioned to be maintained in open position when said burner is operating, and a continuous pilot for said burner, said pilot being so positioned as to heat and maintain said safety cut-off valve in open position when said burner is inoperative and so that the pilot flame will merge with the main burner flame to heat said boiler when said burner is operating.

5. In combination, an absorption refrigerating apparatus having a boiler, a primary burner for heating said boiler, a secondary burner for heating said boiler, an on-off valve for said primary burner, a thermostatic cut-off valve connected to render both of said burners inoperative, said thermostatic cut-off valve including a thermostatic element arranged to be directly heated by the flame of said secondary burner when the primary burner is inoperative, and a heat conductive element positioned to conduct heat to said thermostatic element from the flame of said primary burner when it is in operation.

6. In combination, an absorption refrigerating apparatus having a boiler, said boiler having a draft producing combustion flue, a primary burner positioned to have its flame drawn into said flue, a valve for controlling the fuel supply to said burner, a secondary burner connected to be supplied with fuel independently of said valve, a thermostatic safety cut-off valve operative to cut off fuel to both of said burners, said thermostatic cut-off valve being so constructed and arranged as to be maintained in open position by the flame of either of said burners, and said secondary burner being so arranged relative to the primary burner that its flame will merge with that of the primary burner and be drawn into said flue to heat said boiler so long as there is a demand for refrigeration.

7. In combination, an absorption refrigerating apparatus having a boiler, a primary gas burner for heating said boiler, a thermostatic safety cut-off valve for said primary burner positioned to be heated by the flame of said primary burner when the primary burner is in operation, a secondary burner positioned to heat said thermostatic cut-off valve when the primary burner is inoperative, thermally responsive means operative to supply fuel to said primary burner so long as there is a demand for refrigeration, said secondary burner being so positioned relative to the primary burner that the flame of the secondary burner will be attracted by the flame of the primary burner so as to merge therewith, to heat said boiler during a demand for refrigeration and so that the secondary burner does not heat the boiler while there is no demand for refrigeration.

8. In combination, an absorption refrigerating apparatus having a boiler, a primary burner for heating said boiler, a gas line for leading gas to said burner, a valve in said line, a secondary burner connected to said line ahead of said valve, a thermostatic safety cut-off valve in said line in advance of said valve and the point of connection of said secondary burner, said thermostatic cut-off valve being so constructed and arranged as to be heated by the flame of either of said burners, and said secondary burner being so arranged relative to said primary burner that its flame will merge with that of the primary burner to heat said boiler when both are in operation.

9. The method of controlling the operating of a three-fluid absorption refrigerating apparatus charged with a refrigerant medium, an absorbent medium and a pressure equalizing medium and of the type having a boiler, a motor driven unit for circulating said mediums in the apparatus, a primary burner for heating the boiler, a thermostatic safety valve for said burner and a secondary burner for maintaining said thermostatic safety valve in open position, said method comprising, continuously supplying gas to said secondary burner to maintain the thermostatic safety valve in open position, intermittently energizing said motor driven circulator, supplying gas to the primary burner and transferring heat generated by the secondary burner to the boiler.

10. In combination, a boiler to be heated, a draft producing primary burner for heating said boiler, a secondary burner for heating said boiler, a thermostatic cut-off valve for rendering both of said burners inoperative, said secondary burner being so arranged relative to said boiler, primary burner and thermostatic cut-off valve as to be rendered operative to supply heat to said boiler when said primary burner is in operation and to be rendered inoperative to supply heat to said boiler and operative to maintain said thermostatic cut-off valve in open position when said primary burner is inoperative.

11. In combination, a draft producing primary burner, a secondary burner, a thermostatic cut-off valve for rendering said primary burner inoperative, said thermostatic cut-off valve being so constructed and arranged as to be maintained in open position by said secondary burner when said primary burner is inoperative, and said secondary burner being so arranged relative to said primary burner that its flame will merge with that of the primary burner due to the draft produced by said primary burner when said primary burner is operating.

12. In combination, a draft producing primary burner, a secondary burner, a thermostatic cut-off valve for rendering both of said burners inoperative, said thermostatic cut-off valve having a thermostatic element arranged to be directly heated by the flame of said secondary burner when said primary burner is inoperative, a conductive element to conduct heat from the flame of said primary burner to said thermostatic element, said secondary burner being so positioned relative to said primary burner that its flame merges with that of the primary burner due to the draft produced thereby when the primary burner is operating, whereby said cut-off is heated by the secondary burner when the primary burner is inoperative and by the primary burner when the primary burner is operating.

13. In combination with an absorption refrigeration apparatus having a heat operated refrigerant generator, a draft producing primary burner for heating said generator, a continuously operating pilot burner for said primary burner, said pilot burner being so arranged relative to said generator and primary burner as to supply heat to said generator when said primary burner is operative and to be rendered inoperative to supply heat to said boiler when said primary burner is inoperative.

14. In combination, a boiler to be heated, a draft producing primary burner for heating said boiler, a secondary burner for heating said boiler, said secondary burner being so arranged relative to said boiler and primary burner that substantially no heat from the secondary burner is supplied to said boiler when said primary burner is inoperative and heat is supplied to said boiler from said secondary burner when said primary burner is operative.

15. In combination, a boiler to be heated, a draft producing primary burner for heating said boiler, a secondary burner for heating said boiler, a supply conduit for supplying fuel to said burners, a cut-off valve operative in response to a condition created by the operation of said boiler to cut-off the supply of fuel to said primary burner but inoperative to cut off the supply of fuel to said secondary burner, a thermostatic safety valve operative to cut off the supply of fuel to both burners, said secondary burner being so positioned relative to said boiler and primary burner as to supply heat to said boiler when the primary burner is in operation but to be inoperative to supply heat to said boiler when said primary burner is inoperative, said thermostatic safety valve being so constructed and arranged to be heated by the flame of said secondary burner when said primary burner is inoperative.

16. In combination, a primary burner, a secondary burner, an on-off valve for said primary burner, a thermostatic cut-off valve for rendering both of said burners inoperative, said thermostatic cut-off valve including a thermostatic element arranged to be directly heated by the flame of said secondary burner when the primary burner is inoperative and a conductive element to conduct heat to said thermostatic element from the flame of said primary burner when it is in operation.

17. In combination, a draft producing primary burner, a secondary burner, conduit means for conducting gas to said burner, a cut-off valve operable to cut off the flow of gas to said primary burner but inoperative to cut off flow of gas to said secondary burner, a thermostatic safety valve so constructed and arranged as to be held in open position when said primary burner is operating, said secondary burner being so positioned relative to said primary burner that its flame will merge with that of said primary burner when said primary burner comes into operation and a manually operable by-pass valve by-passing said safety valve.

18. In combination, an absorption type refrigerator having a refrigerant generator, an evaporator, a main burner for heating said generator, a continuous pilot for igniting said main burner when fuel is supplied thereto, means responsive to the temperature in the vicinity of said evaporator for supplying fuel to said main burner when the temperature rises above a predetermined normal, said burners and said generator being so arranged relative to one another that the pilot flame is diverted from a normal position in which it does not heat said generator to a generator heating position when said main burner is burning whereby the fuel supplied to the main burner and to the pilot is utilized to heat said generator during a demand for refrigeration.

19. In combination, a horizontally positioned primary burner, a gas conduit for leading gas to said primary burner extending horizontally above said primary burner beyond the open end thereof, a safety cut-off valve in said conduit, a thermostatic disc for operating said valve positioned immediately above and forward of the open end of said primary burner, a secondary burner receiving gas from said conduit positioned at the open end of said primary burner below said thermostatic disc whereby its flame extends upwardly to heat the thermostatic element when said primary burner is not operating to maintain said valve in its open position and is drawn out of heating relationship with said thermostatic disc to merge with the flame of said primary burner when said primary burner comes into operation, and a heat conducting element in thermal contact with said thermostatic disc positioned to transmit heat from the merged flames of both burners when said primary burner is in operation.

JUSTICE H. BEACH.